United States Patent
Yim (10) Patent No.: US 11,750,544 B2
(45) Date of Patent: *Sep. 5, 2023

(54) AUTOMATED ASSISTANT ARCHITECTURE FOR PRESERVING PRIVACY OF APPLICATION CONTENT

(71) Applicant: Google LLC, Mountain View, CA (US)

(72) Inventor: Keun Soo Yim, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/850,550

(22) Filed: Jun. 27, 2022

(65) Prior Publication Data

US 2022/0329550 A1    Oct. 13, 2022

Related U.S. Application Data

(63) Continuation of application No. 16/973,380, filed as application No. PCT/US2019/058569 on Oct. 29, 2019, now Pat. No. 11,374,887.

(51) Int. Cl.
*H04L 51/046* (2022.01)
*G06F 9/455* (2018.01)
*H04L 51/02* (2022.01)

(52) U.S. Cl.
CPC ........ *H04L 51/046* (2013.01); *G06F 9/45558* (2013.01); *H04L 51/02* (2013.01); *G06F 2009/45587* (2013.01)

(58) Field of Classification Search
CPC ..... H04L 51/046; H04L 51/02; G06F 9/4558; G06F 2009/45587; G06F 9/451;
(Continued)

(56) References Cited

U.S. PATENT DOCUMENTS 7,559,048 B1 * 7/2009 Bedell .................. G06F 16/289
717/122
8,479,259 B2 * 7/2013 Devine ............... H04L 41/0253
709/229

(Continued)

FOREIGN PATENT DOCUMENTS

CN          1596521       3/2005
WO        2021086331      5/2021

OTHER PUBLICATIONS

Mrkor K-U: "Nachgehakt Windows-Nachrichten Filtern MIT Hook-Funtionen;" CT Magazin Fuer Computer Technik, Heise Zeitschriften Verlag, DE, No. 5, p. 272; Mar. 1, 1999.

(Continued)

*Primary Examiner* — Sargon N Nano
(74) *Attorney, Agent, or Firm* — Gray Ice Higdon (57) ABSTRACT

Implementations set forth herein relate to an automated assistant that allows third party applications to inject dependencies to leverage automated assistant functions. Furthermore, enabling such dependency injections can allow third party applications to preserve privacy of any application content that is used during execution of automated assistant functions. In some implementations, a third party application can initialize a function with an assistant dependency using parameters that are tagged as private. Initializing a function in such as a way can allow private content communicated between the third party application and the automated assistant to be abstracted for security purposes. The abstracted content can thereafter be communicated to a remote server—such as a server hosting an extensively trained machine learning model. Intelligent output provided by the server can then be incorporated into one or more processes of the third party application without comprising security.

20 Claims, 7 Drawing Sheets

(58) Field of Classification Search
CPC .... G06F 9/453; G06F 9/545; G06F 2209/542; G06F 9/542; G06Q 10/10
See application file for complete search history.

(56) References Cited

U.S. PATENT DOCUMENTS

| | | | | |
|---|---|---|---|---|
| 8,914,840 B2* | 12/2014 | Reisman | ............ | H04N 21/6587 |
| | | | | 725/113 |
| 9,223,683 B1* | 12/2015 | Knych | ................ | G06F 11/3684 |
| 9,318,108 B2 | 4/2016 | Gruber et al. | | |
| 10,223,074 B2* | 3/2019 | Brandys | ................. | G06F 9/455 |
| 10,741,185 B2 | 8/2020 | Gruber et al. | | |
| 10,855,625 B1* | 12/2020 | Viswanathan | .......... | H04L 51/02 |
| 11,557,285 B2* | 1/2023 | Bak | ......................... | G06F 3/167 |
| 2002/0026345 A1 | 2/2002 | Juels | | |
| 2004/0145601 A1* | 7/2004 | Brielmann | .............. | G06F 9/453 |
| | | | | 715/708 |
| 2006/0026122 A1* | 2/2006 | Hurwood | .............. | G06F 16/838 |
| | | | | 715/255 |
| 2011/0185340 A1 | 7/2011 | Trent et al. | | |
| 2012/0216219 A1* | 8/2012 | Sharma | ................. | G16H 40/20 |
| | | | | 719/331 |
| 2012/0233591 A1* | 9/2012 | Thyagarajan | ............. | G06F 8/61 |
| | | | | 717/107 |
| 2012/0233593 A1 | 9/2012 | Sahoo et al. | | |
| 2013/0110520 A1 | 5/2013 | Cheyer et al. | | |
| 2014/0289391 A1 | 9/2014 | Balaji et al. | | |
| 2016/0098346 A1 | 4/2016 | Pechanec et al. | | |
| 2016/0308982 A1* | 10/2016 | Greene | ............... | H04L 41/0894 |
| 2017/0168778 A1 | 6/2017 | Brandys et al. | | |
| 2017/0214701 A1* | 7/2017 | Hasan | ................. | H04L 63/1491 |
| 2018/0081644 A1* | 3/2018 | Sahoo | ....................... | G06F 8/20 |
| 2018/0165183 A1* | 6/2018 | Kremp | ................ | G06F 21/6218 |
| 2019/0294477 A1 | 9/2019 | Koppes et al. | | |
| 2019/0324798 A1 | 10/2019 | Zou et al. | | |
| 2019/0370299 A1* | 12/2019 | Owens | ............... | G06Q 30/0201 |
| 2020/0019414 A1* | 1/2020 | Byard | ................. | G06F 9/44526 |
| 2020/0389317 A1* | 12/2020 | Dunjic | ................... | H04L 67/00 |
| 2021/0328949 A1 | 10/2021 | Yim | | |

OTHER PUBLICATIONS

European Patent Office; International Search Report and Written Opinion of PCT Ser. No. PCT/US2019/058569; 13 pages dated Jul. 14, 2020.

Intellectual Property India, First Examination Report issued in Application No. IN202227019456, 7 pages, dated Aug. 17, 2022.

* cited by examiner

AUTOMATED ASSISTANT ARCHITECTURE FOR PRESERVING PRIVACY OF APPLICATION CONTENT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

Various third party applications can be loaded onto a computing device that can provide access to an automated assistant, but such applications may not be able to leverage benefits of the automated assistant. Although many computing devices offer inter-process communications that allow applications to communicate between each other, leveraging resources in this way can result in excess consumption of memory and processing bandwidth. For example, when duplicative processes are executed between applications, such as when attempting to fulfill an application programming interface (API) call, resource limitations and/or complexity of data can cause delays. Furthermore, processes executed between applications can exhibit vulnerabilities with respect to security. Processes executed between applications can exhibit vulnerabilities that make privacy of certain transactions difficult to preserve.

SUMMARY

Implementations set forth herein relate to enabling third party applications to selectively incorporate features of a first party automated assistant, while preserving security of third party content and making more efficient uses of memory and processing bandwidth. In some implementations, a third party application can be a messaging application for allowing a user to communicate with other users via a client device on which the third party application is installed. The third party application can include various containers (e.g., a client container) that can be loaded into memory according to particular functions of the third party application that the user is interacting with. As an example, the user can be using a feature of a messaging application that allows a user to participate in a group conversation with multiple other users. When an interface for the group conversation is initialized, the third party application can cause a service container to be loaded into memory of a computing device on which the third party application is installed. The service container can include code for establishing certain functions (e.g., automated assistant functions) that can be used by the third party application when the interface for the group conversation is being rendered at the computing device.

In some implementations, functions in the container can be used to provide automated assistant functionality at the interface of the third party application. Such functionality can include an ability of the automated assistant to suggest certain actions that the automated assistant is able to perform for assisting users with certain application functionality (e.g., rendering suggestions for actions that the automated assistant can perform). In order to enable such functionality at the third party application, and any other application that may be installed on the computing device, functions established within a particular client container of the third party application can be injected with dependencies from a service container. The injected dependences can be established for a particular client container that allows for certain functions of the group conversation interface to be accessible. For instance, a function "suggestAction" can be identified in a client container "groupConversation," and the function "suggestAction" can have input parameter data such as "assistantSuggest," "input," and "context" (e.g., suggestAction(assistantSuggest, input, context)). The "assistantSuggest" parameter can be correlated to an automated assistant function that can use, as input, a portion of a received message and contextual data associated with the received message, in order to identify automated assistant actions to suggest to the user.

The client container "groupConversation" can be instantiated in response to the third party application initializing a process—but, because the client container would not initially be injected with dependencies corresponding to the automated assistant function (e.g., "suggestActionMessaging" from the service container), the automated assistant function would not be instantiated initially. In other words, the automated assistant function would not rely on instantiation of the client container, since the automated assistant function is decoupled from the container. This can preserve computing device resources, such as RAM, which might otherwise be consumed when multiple third party applications instantiate containers with similar or identical functions. In order to execute certain functionality available via the automated assistant, a data object embodying the automated assistant function to be executed can be instantiated separately via an injector container. In other words, the client container that is instantiated in order to provide certain third party functionality would not depend on instantiation of the data object referencing the automated assistant function. However, that data object may need to reference the automated assistant function to be executed.

In furtherance of the aforementioned example, the data object corresponding to an automated assistant object "assistantSuggest" can be instantiated when a container "groupConversation" is instantiated by the third party application. The automated assistant object "assistantSuggest" can then be assigned a particular function by the third party application in response to another signal and/or other data associated with the third party application. For example, an input from the user can cause an injector class to be instantiated in memory for assigning a value to the "assistantSuggest" object. In some implementations, in order to support a particular function for the automated assistant object, a class "Assistant," which can be available via a software development kit (SDK), can be instantiated and can include functions such as "suggestActionMessaging" and "suggestActionImage." The "suggestActionMessaging" function can be employed by the third party application by directing the third party container object "assistantSuggest" to the "suggestActionMessaging" function. Simultaneously, a separate container, e.g., "videoCapture," can be instantiated by a different third party application. The separate container can include a different function, such as "imageSuggestion(assistantSuggest, input, context)"), which can have another third party object "assistantSuggest" that can be directed to the assistant function "suggestActionImage."

In some implementations, certain content generated via a third party application can be intentionally limited or inaccessible via other applications. However, using the dependency injection(s) according to some implementations herein, access restrictions corresponding to such content can be maintained while still leveraging functionality of an automated assistant. In order to leverage benefits of some automated assistant functions that may be available via a remote server (e.g., an extensively trained machine learning model), such restricted content can be flagged and processed in a way that maintains privacy of the content. For example, in some implementations the third party application can capture a screen shot, or other collection of data, and employ one or more automated assistant functions to generate action suggestions based on the screen shot. The third party application can instantiate a container that has a dependency injected from an automated assistant container in order to initiate processing of the screen shot without compromising privacy of the third party application, and while also preserving memory.

For example, when the user enters a group conversation via the third party application, the third party application can call the "suggestAction" function from the "groupConversation" container. Thereafter, the user can initialize an automated assistant in order to receive assistance during the group conversation. In response, initializing the automated assistant (e.g., via touch input to a keyboard) can cause the "assistantSuggest" object of the "suggestAction" function to be assigned the function "suggestActionImage" (e.g., Sgroupconversation=>setAssistantSuggest("suggestActionImage")). Furthermore, a screenshot can be generated and assigned to an object "input" of the function "suggestAction" and/or contextual data (e.g., a location, time, schedule, and/or any other context data) can be generated and assigned to an object "context" of the function "suggestAction." The function "suggestAction" will be processed in a stack. As a result, a suggestion can be rendered for the user during their group conversation, and the object assignments generated as a result can be subsequently cleared from memory.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
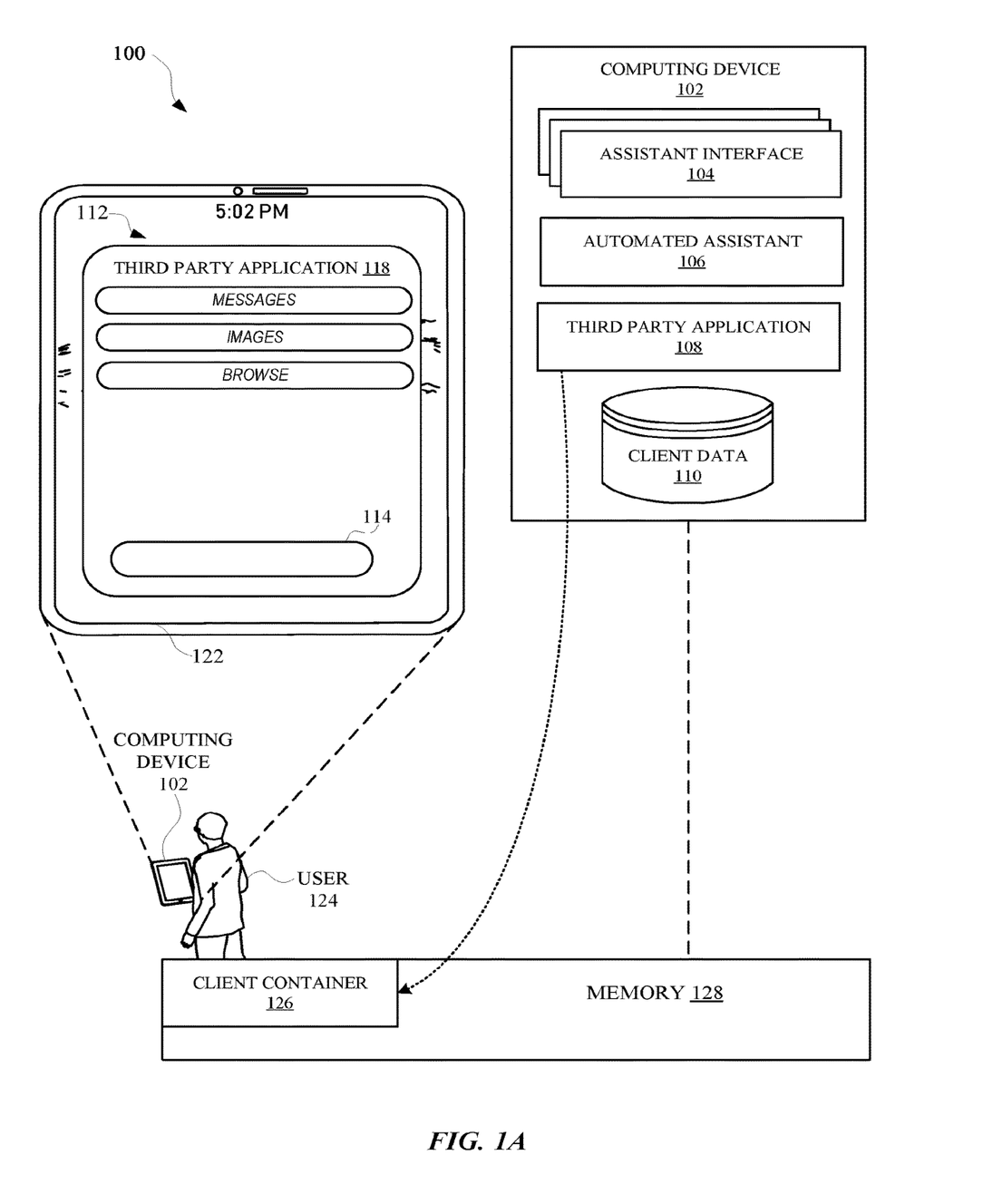
FIG. 1A, FIG. 1B, FIG. 1C, and FIG. 1D illustrate views of a user interacting with a third party application in furtherance using automated assistant functionality that is employed via various containers.

FIG. 1A, FIG. 1B, FIG. 1C, and FIG. 1D illustrate a view 100, a view 120, a view 140, and a view 160 of a user 124 interacting with a third party application 118 in furtherance of using automated assistant functionality that is employed via various containers. Specifically, the view 100 of FIG. 1A illustrates the user 124 initializing the third party application 118, which can operate to provide a variety of different functionality that can be made available via any type of computer application. For instance, the third party application 118, and/or any other client application, can be a messaging application that allows the user 124 to communicate with multiple different users in a graphical user interface (GUI) 112 that is being rendered at a display panel 122 of the computing device 102. In response to initializing the third party application 118, the third party application 118 and/or the computing device 102 can cause a client container 126 to be instantiated in memory 128 of the computing device 102. The client container 126 can identify one or more objects that depend on a user input and/or another container to be instantiated in order for the one or more objects to have an assigned reference value.

Figure 1B:
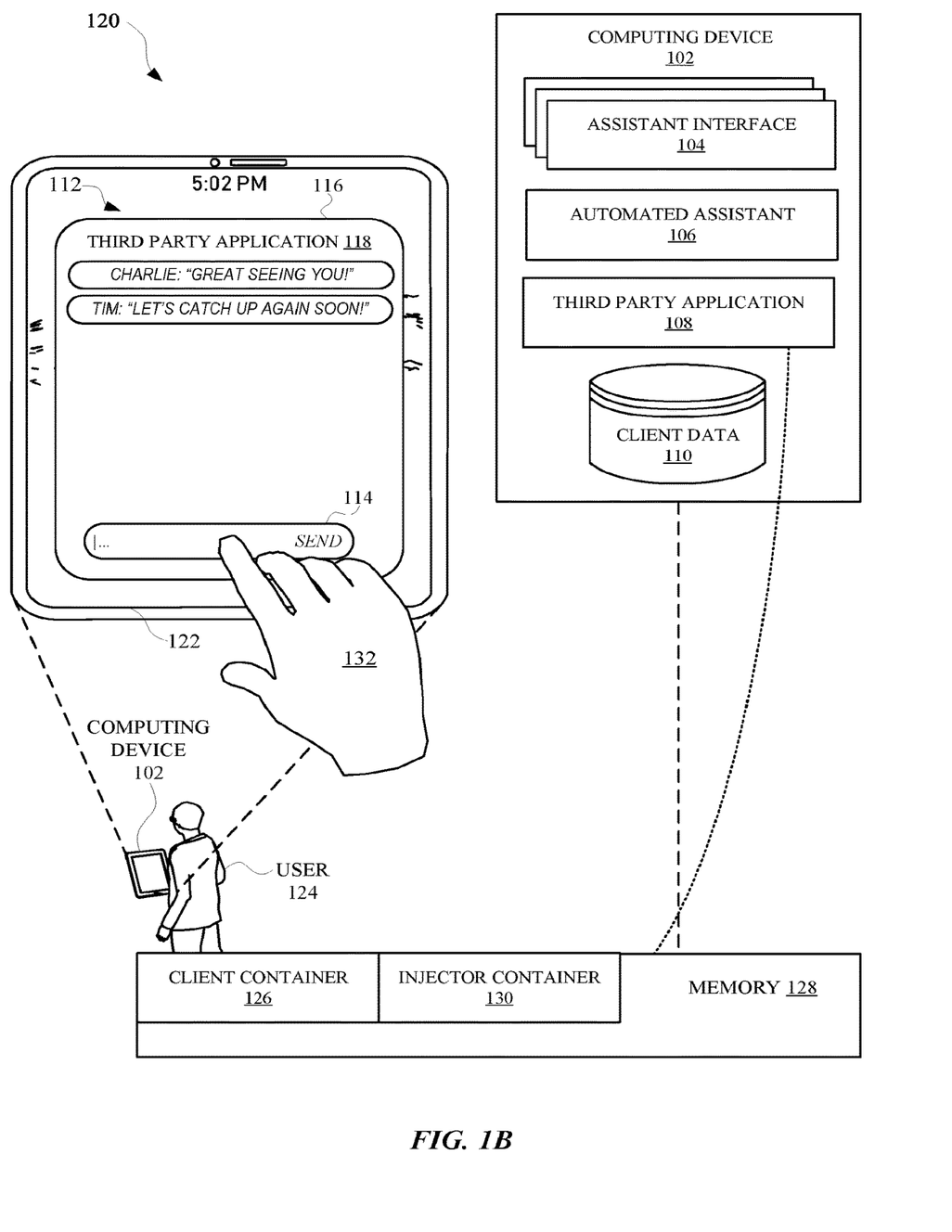
Figure 1C:
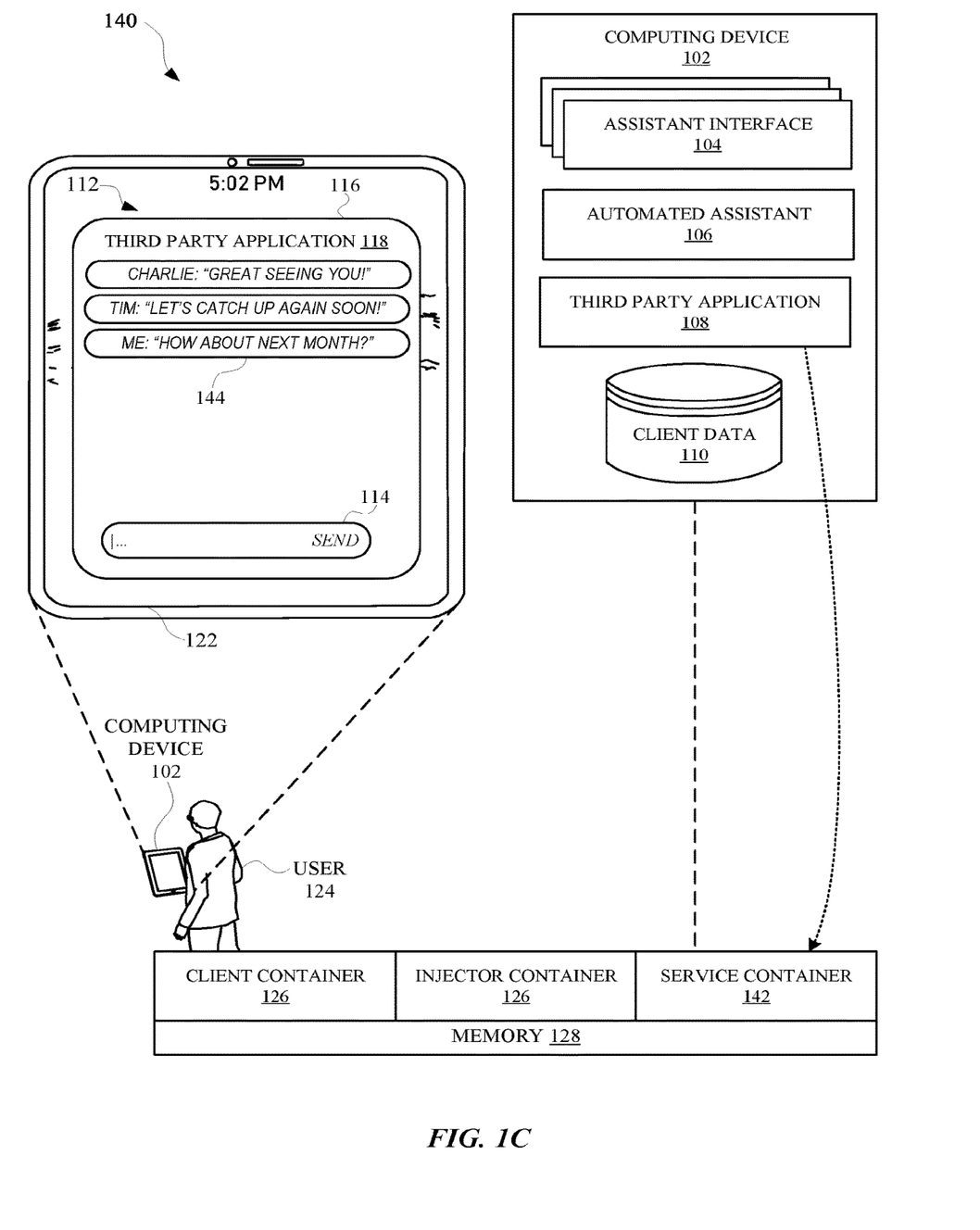

As an example, in response to the user 124 accessing the third party application 118, the client container 126 can be instantiated in the memory 128 with a variety of dependent objects that include an assistantSuggest( ) object and one or more separate dependent objects. The assistantSuggest( ) object can be assigned a reference value based on how the user 124 interacts with the third party application 118. For example, in response to the user 124 invoking a camera function of the third party application 118, the third party application 118 can cause a particular injector container to be instantiated in memory for assigning a particular value to the assistantSuggest( ) object. The particular value can refer to an automated assistant function of an automated assistant 106 that allows the third party application 118 to provide automated assistant suggestions based on images. Additionally, or alternatively, the third party application 118 can cause a different injector container to be instantiated in memory for assigning a separate value or different value to the assistantSuggest( ) object. For example, in response to the user 124 using their hand 132 to tap on a text field 114 of the third party application 118, an injector container 130 can be instantiated in the memory 128, as illustrated in FIG. 1B.

The injector container 130 can assign a value to the assistantSuggest( ) that corresponds to an automated assistant function (i.e., automated assistant action) of the automated assistant 106 that allows the third party application 118 to provide automated assistant suggestions based on group messages and/or any other messaging functionality. For instance, the injector container 130 can be instantiated in memory 128 with a reference value such as messageAssistantSuggest( ), which can be correlated to the assistantSuggest( ) object using client data 110. In some implementations, the assistantSuggest( ) object can include input parameters that the reference value can be mapped to. For example, input parameter data for the assistantSuggest( ) object can include a function input, application input, and/or application context (e.g., assistantSuggest(Sfunction, Sinput, Scontext).

Based on the assistantSuggest( ) object being assigned the value corresponding to the assistant function identified by the injector container 130, the third party application 118 and/or the computing device 102 can cause a service container 142 to be instantiated in the memory 128. Specifically, as illustrated in view 140 of FIG. 1C, the service container 142 can be instantiated in memory 128 from a separate memory of the computing device 102. For example, the client data 110 can include various application data, and the memory 128 can be one or more random access memory (RAM) devices and/or any other storage device accessed by a processor during execution of stack operations. In some implementations, one or more parameters of the assistantSuggest( ) object can be assigned according to user input to the computing device 102 and/or any other data that is accessible to the third party application 118 and/or the computing device 102. As an example, the user 124 can provide a textual input 144 to the third party application 118 in furtherance of communicating in a group chat with other users (e.g., Tim and Charlie). The third party application 118 can use natural language content incorporated into the textual field 114 as an input parameter to the assistant function (e.g., messageAssistantSuggest( )) that has been assigned to the assistantSuggest( ) object. Additionally, or alternatively, and with prior permission from the users, the third party application 118 can use natural language content from the group messages as input parameters to the messageAssistantSuggest( ) function.

Figure 1D:
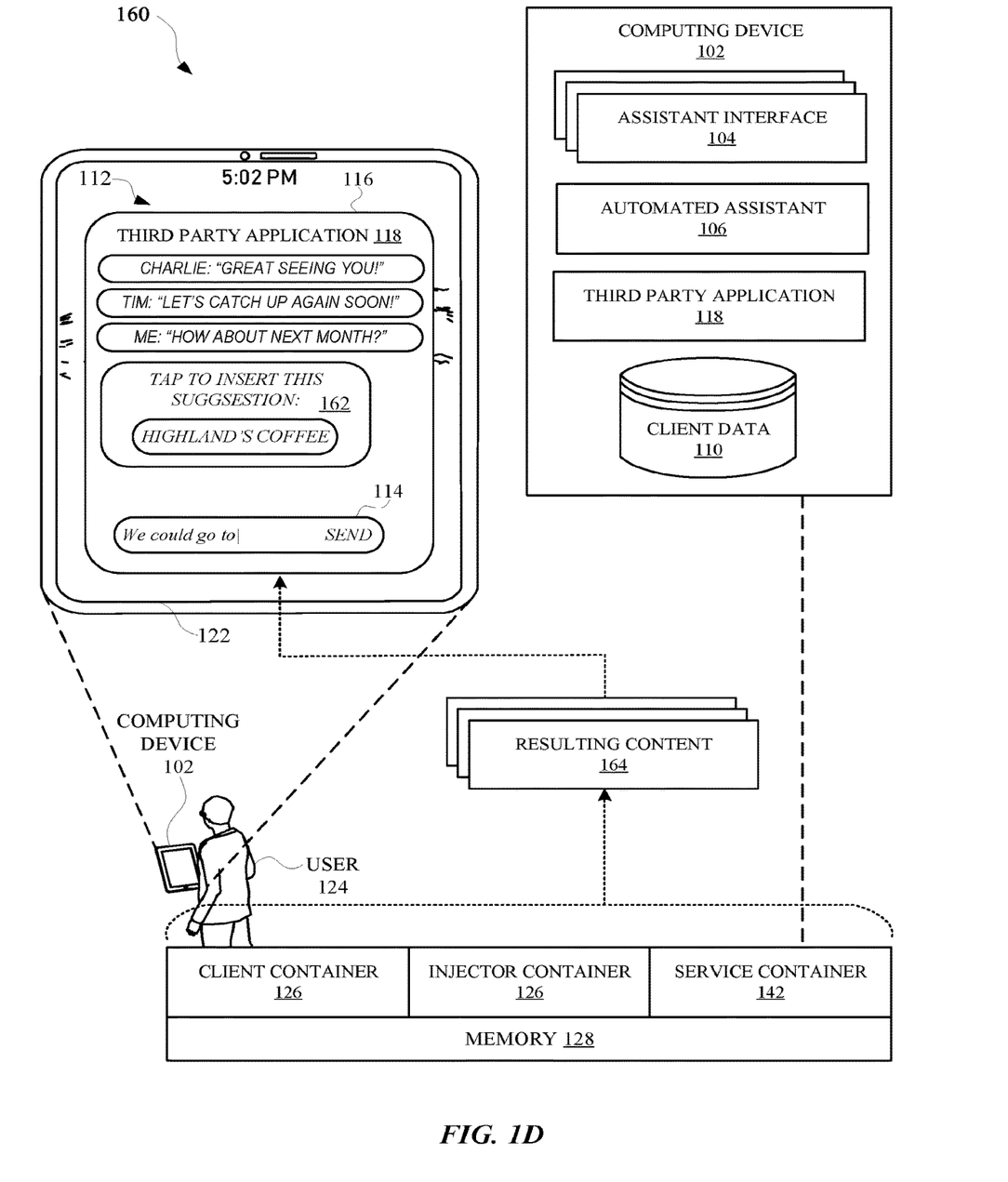

As provided in view 160 of FIG. 1D, the various containers in the memory 128 can be processed by one or more processors of the computing device 102 in order to generate resulting content 164. The resulting content can be generated using at least the messageAssistantSuggest( ) function characterized by the service container 142. Furthermore, textual input that is based on content of the graphical user interface 112 can be provided as input to the messageAssistantSuggest( ) function, at least based on a correlation set forth by the injector container 130. Processing application objects in this way can preserve memory and privacy for the computing device 102 and the user 124, as the textual content would not need to be shared with a separate application. Rather, the messageAssistantSuggest( ) function can be executed as part of a third party application 118 stack operation resulting in resulting content 164. The resulting content 164 can then be rendered at the graphical user interface 112 as a suggestion 162 for the user 124 to interact with. For instance, based on processing certain natural language content rendered at the graphical user interface 112, the third party application 118 can leverage automated assistant functionality to provide the suggestion 162 for meeting at a coffee shop called "Highland's Coffee." When the user 124 selects the suggestion 162, the name of the entity "Highland's Coffee" can be entered into the text field 114 and/or a link to a website corresponding to the entity can be provided in a group chat 116 for all users to see and/or otherwise interact with.

In some implementations, resulting content 164 can be generated using one or more engines that are instantiated in memory 128 for executing with the input parameters. As an example, the one or more engines can include a trained machine learning model that is used by the third party application 118 to generate the resulting content 164 from the input parameters. The input parameters can include content being rendered at the display panel 122 of the computing device 102 and/or contextual data characterizing a context in which the user 124 is interacting with the third party application 118. For example, the contextual data can characterize, with prior permission from the users, a location of each person participating in the group chat 116. The contextual data can be used in combination with the trained machine learning model in order to identify a suitable location for each participant to meet at a time that is identified in the conversation. In this way, because the one or more engines have been instantiated by the third party application 118, the input parameters and/or contextual data would not need to be processed outside of any containers of the third party application 118. Furthermore, because the service container 142 is instantiated on demand, the models would not necessarily occupy RAM or similar memory until data provided by the injector container 130 correlates a dependent object of the client container 126 to a function and/or model characterized by the service container 142.

Figure 2:
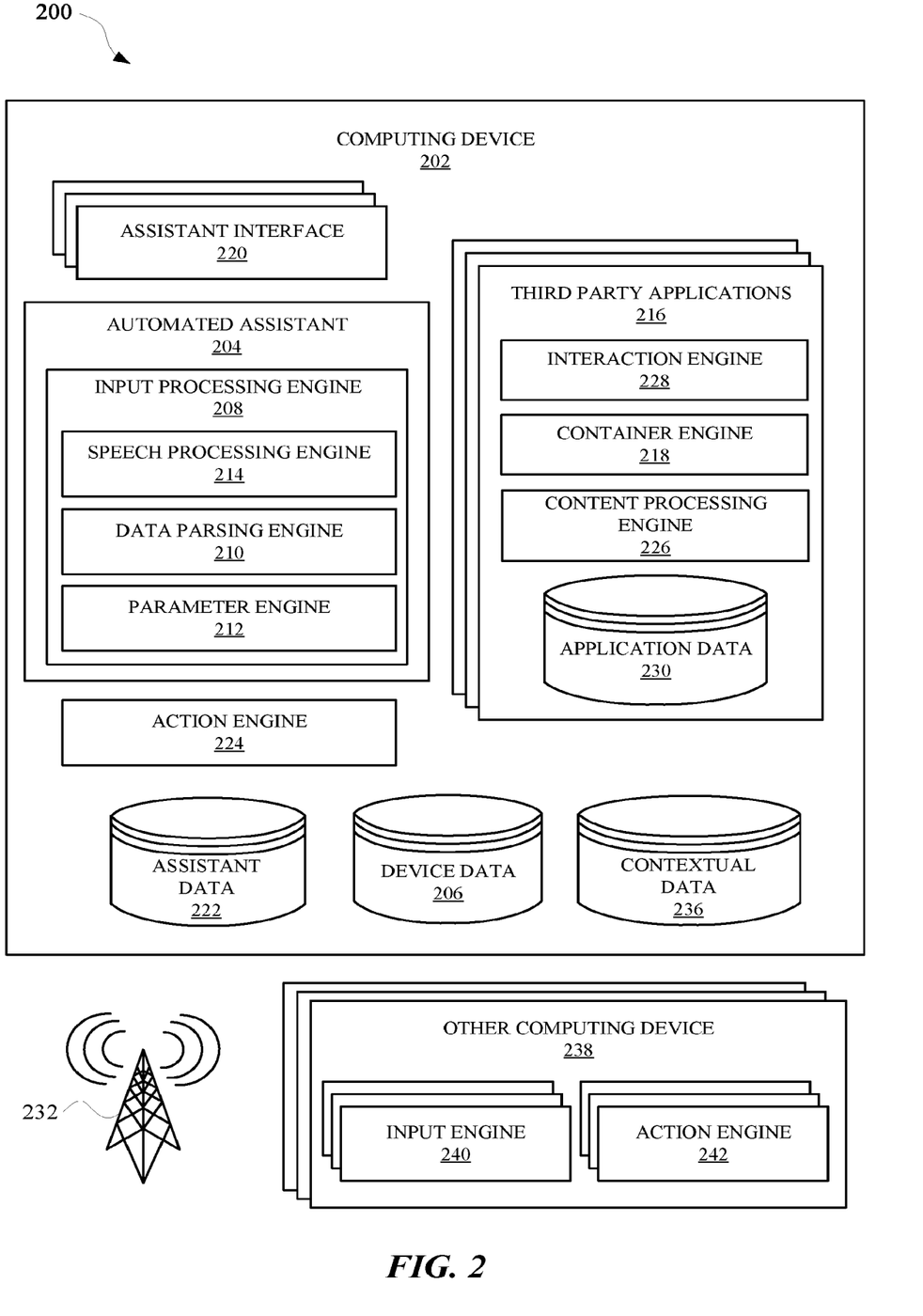
FIG. 2 illustrates a system that provides automated assistant functionality by providing containers with dependencies injected using one or more assistant containers.

FIG. 2 illustrates a system 200 that includes a computing device 202 with one or more third party applications 216, and/or any client application, that provide automated assistant 204 functionality. The automated assistant 204 functionality can be provided using containers with dependencies injected using one or more assistant containers included with the third party application 216. The automated assistant 204 can operate as part of an assistant application that is provided at one or more computing devices, such as a computing device 202 and/or another computing device 238 (e.g., a server device). A user can interact with the automated assistant 204 via an assistant interface 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to perform a function (e.g., provide data, control a peripheral device, access an agent, generate an input and/or an output, etc.). The computing device 202 can include a display device, which can be a display panel that includes a touch interface for receiving touch inputs and/or gestures for allowing a user to control third party applications 216 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera (or include a camera), but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 208, which can employ multiple different modules and/or engines for processing inputs and/or outputs for the computing device 202 and/or a server device. For instance, the input processing engine 208 can include a speech processing engine 214, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 222 can be stored at the server device and/or the computing device 202, and can include data that defines one or more actions capable of being performed by the automated assistant 204, as well as parameters necessary to perform the actions. The assistant data 222 generated via the input processing engine 208 can be processed by an action engine 224, in order to cause the automated assistant 204 to provide an output to the user via an assistant interface 220, and/or initialize one or more actions associated with one or more third party applications 224.

In some implementations, the computing device 202 can include one or more third party applications 224, which can be provided by a third-party entity that is different from an entity that provided the computing device 202 and/or the automated assistant 204. An action engine 224 of the automated assistant 204, third party application 216, and/or the computing device 202 can access application data 230 to determine one or more actions capable of being performed by one or more third party applications 224. Furthermore, the application data 230 and/or any other data (e.g., device data 206) can be accessed by the automated assistant 204, the third party application 216, and/or the computing device 202 to generate contextual data 236, which can characterize a context in which a particular third party application 216 is executing at the computing device 202, and/or a context in which a particular user is accessing the automated assistant 204 and/or the computing device 202.

While one or more third party applications 224 are executing at the computing device 202, the device data 206 can characterize a current operating status of each third party application 216 executing at the computing device 202. Furthermore, the application data 230 can characterize one or more features of an executing third party application 216, such as content of one or more graphical user interfaces being rendered at the direction of one or more third party applications 224. In some implementations, the action engine 224 can initialize performance of one or more actions of the automated assistant 204 at the direction of the third party application 216.

In some implementations, one or more third party applications 216 can provide in-app processing for operations that are security sensitive (i.e., operations that an entity and/or a user has identified as using restricted content) and/or demand instances of automated assistant modules and/or engines. A third party application 216 can include an interaction engine 228 that determines whether one or more operations being performed by the third party application 216 should employ another computing device 238 and/or use some amount of in-app processing to perform the one or more operations. In order to determine whether one or more portions of data and/or one or more operations should be processed in memory address space of the third party application 216 and/or at another computing device 238, the third party application 216 can flag the one or more portions of data and/or one or more operations. For example, in response to a user interacting with an interface of the third party application 216, the interaction engine 228 can determine whether the interaction corresponds to a security sensitive operation and/or a security sensitive portion of data (e.g., restricted content). When the interaction engine 228 determines that the operation and/or portion of data is security sensitive, the interaction engine 228 can generate a tag to flag the operation and/or the portion of data as security sensitive, and/or communicate with a container engine 218 for instantiating one or more containers suitable for performing security sensitive operations and/or processing security sensitive data.

When the interaction engine 228 indicates that a particular operation is security sensitive (e.g., the operation involves accessing messages, photos, calendar information, location data, and/or other data), the container engine 218 can cause one or more particular containers to be instantiated in memory. Specifically, the container engine 218 can cause one or more particular containers to be instantiated in a memory address space that is temporarily reserved for the third party application 216. For example, when the third party application 216 is open or otherwise executing at the computing device 202, a client container can be instantiated in memory from the application data 230 stored in a drive and/or application space of the computing device 202. The client container can include one or more dependent objects that can be assigned reference values based on interactions between one or more users and the third party application 216. For instance, when a user accesses a particular interface of the third party application 216, the interaction engine 228 can identify an injector container corresponding to the particular interface.

The injector container can programmatically provide a correspondence between operations that can be performed via the third party application 216 and one or more assistant functions that can be employed by the third party application 216. In other words, in response to the third party application 216 initializing a particular operation, the third party application 216 can use the injector container to select a reference value to assign to a dependent object identified in the client container. In some implementations, when the reference value corresponds to an automated assistant function, the container engine 218 can cause a service container to be instantiated in the memory of the computing device 202.

The service container can be associated with a software development kit (SDK) and/or any other software package provided by an entity that also provided the automated assistant 204. The service container can programmatically provide a variety of different functions, variable, libraries, objects, and/or any other data that can be incorporated into an application. As an example, the service container can include an imageAssistantSuggest( ) function and a textAssistantSuggest( ) function, and at least one of the aforementioned functions can be assigned to the dependent object of the client container using a reference in the injector container. For instance, when the third party application 216 includes a camera operation, the interaction engine 228 can determine that the camera operation is a security sensitive operation. Based on this determination, the interaction engine 228 can cause the injector container to reference the imageAssistantSuggest( ) function of the service container, in order that the function and/or any engines associated with the function can be instantiated in shared address space with the third party application 216. Thereafter, should the user invoke the third party application 216 to perform a camera operation, the content processing engine 226 can cause the imageAssistantSuggest( ) function to be executed in the shared address space.

In some implementations, when the interaction engine 228 determines that a particular operation of the third party application 216 can be initialized but does not correspond to a security sensitive operation, the third party application 216 can employ another computing device 238 for assisting with performing the operation. As an example, in response to an operation of the third party application 216 being initialized, the interaction engine 228 can determine that the operation is not a security sensitive operation. The interaction engine 228 can then cause a dependent object of the client container to be correlated with a function that allows the third party application 216 to leverage processing capabilities of one or more action engines 242 provided at another computing device 238. For instance, the operation initialized via the third party application 216 can result in execution of a function that causes the third party application 216 to provide content to an input engine 240 via a network 232, such as the internet.

The input engine 240 can process the content and identify a particular action engine 242 and/or model to employ for further processing the content. For example, in some implementations, the input engine 240 can select a trained machine learning model from one or more trained machine learning models that are accessible to the other computing device 238. The one or more trained machine learning models provided at the other computing device 238 can be trained more extensively than one or more trained machine learning models that are provided at the third party application 216 and/or the computing device 202. In other words, the models available at the computing device 238 can be trained according to a total number of sample sets that is greater than a total number of other sample sets that were used to train the models available at the automated assistant 204, the third party application 216, and/or the computing device 202. In some implementations, the third party application 216 can identify itself as a particular type of application to the input engine 240 and, thereafter, the input engine 240 can select a suitable model for use when processing the content.

In some implementations, the interaction engine 228 can determine a setting that controls whether to: instantiate an automated assistant function that causes content to be processed at another computing device 238, or instantiate an assistant function that causes content to be processed locally at the computing device 202. For example, the contextual data 236 can include, with prior permission from the user, a location of the user when the user is interacting with a particular third party application 216. Application data 230 for the third party application 216 can indicate that the user prefers that images be processed at the computing device 202 when the user is at home. In other words, when the user is accessing a camera function of the third party application 216 and invokes automated assistant functionality via the third party application 216, the third party application 216 can limit execution of the automated assistant functionality to be processed at the computing device 202.

As an example, when the user is home and accesses the third party application 216, the container engine 218 can cause a client container to be instantiated in memory of the computing device 202. When the user accesses a camera interface of the third party application 216 for purposes of taking pictures in their home, the container engine 218 can instantiate an injector container into the memory. The injector container can identify multiple different functions for performing various image operations and the client container can include one or more dependent objects that can be assigned a value according to how the user interacts with the camera interface. When the user interacts with the camera interface in a way that initializes an automated assistant operation via the third party application 216, the third party application 216 can identify a setting that indicates a preference of the user with respect to the automated assistant operation. The third party application 216 can determine, from the setting, that the user prefers to have images captured at or near their home to be exclusively processed at their computing device 202, at least when automated assistant functionality is involved. As a result, the third party application 216 can analyze the contextual data 236 to determine whether the user is at home. When the user is at home, the third party application 216 can cause the dependent object to be assigned a value corresponding to an automated assistant function for processing one or more images captured via the third party application 216 at home. When the user is determined to not be at home when they are interacting with the camera interface, the third party application 216 can cause the dependent object to be assigned a value corresponding to a separate automated assistant function for processing one or more other images captured via the third party application 216 when the user is not at or near their home.

In some implementations, a value assigned to a dependent object can be based on a user that is accessing the third party application 216. For example, when a first user is determined to be interacting with the third party application 216, the third party application 216 can assign the dependent object to one or more certain automated assistant functions that rely on local processes (e.g., processes performed exclusively at the computing device 202) to generate third party application content using the automated assistant functions. However, when a second user is determined to be interacting with the third party application 216, the third party application 216 can assign the dependent object to certain other automated assistant functions that rely on remote processes (e.g., processes performed at another computing device 238) to generate third party application content using the other automated assistant functions.

Additionally, or alternatively, one or more settings of the third party application 216 can cause the third party application 216 to assign a particular value to a dependent object of a client container for causing certain content to be abstracted before being further processed using one or more automated assistant functions. As an example, a particular setting of the third party application 216 can cause the third party application 216 to abstract certain textual content (e.g., create an embedding representation of the textual content) and/or any other content, and then execute an automated assistant function assigned to a particular dependent object using the abstracted content. Additionally, or alternatively, the abstracted content can be processed locally or at a remote device according to the setting or one or more other settings of the third party application 216 and/or the automated assistant 204. In this way, privacy and security of third party application content can be preserved while also preserving memory, which can be preserved as a result of how containers are instantiated according to some implementations discussed herein.

Figure 3:
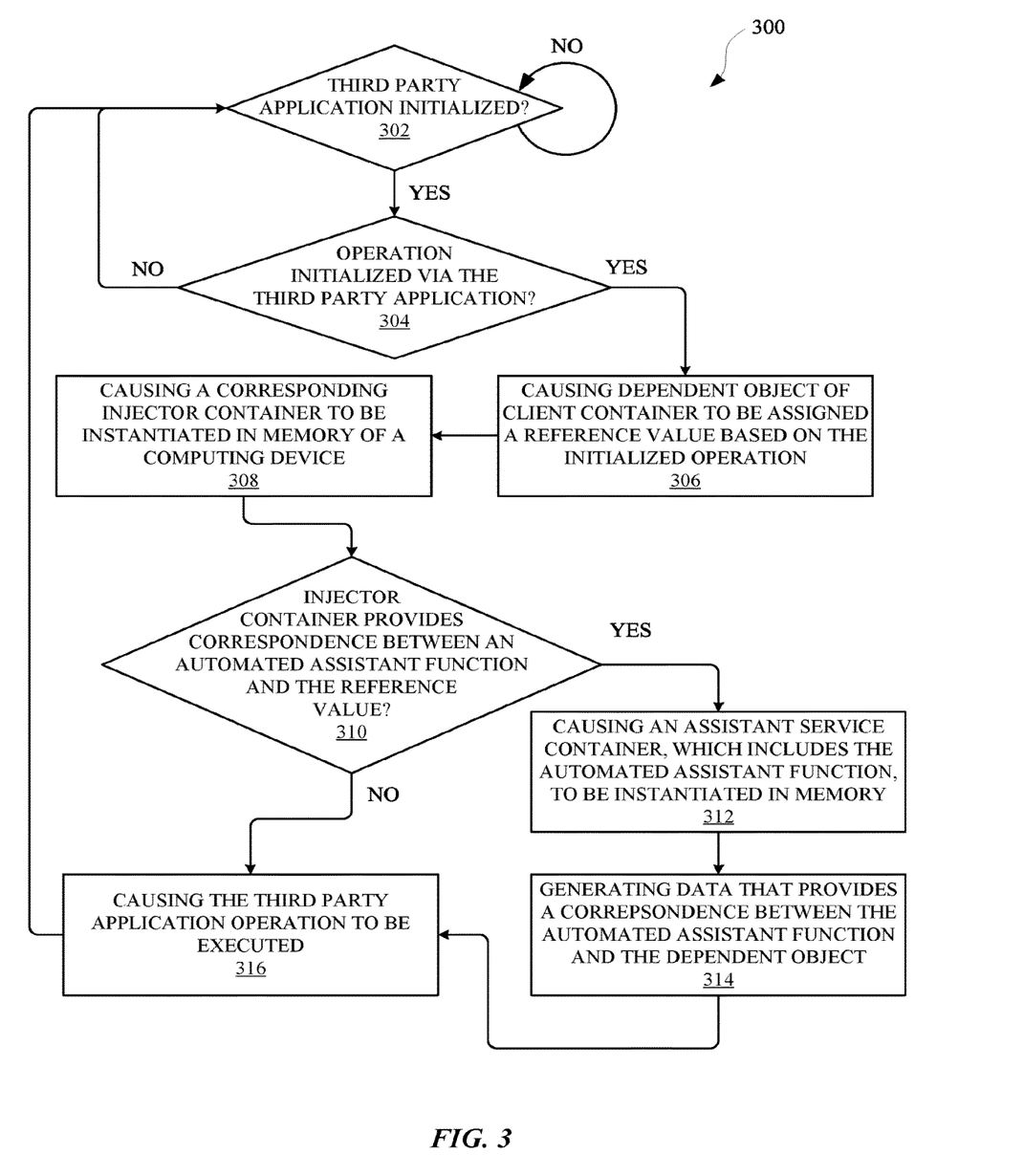
FIG. 3 illustrates a method for performing a third party application operation that is characterized by a container with dependencies injected from a container that characterizes one or more automated assistant functions.

FIG. 3 illustrates a method 300 for performing a third party application operation that is characterized by a container with dependencies injected from a container that characterizes one or more automated assistant functions. The method 300 can be performed by one or more computing devices, applications, and/or any other apparatus or module capable of using automated assistant functionality. The method 300 can include an operation 302 of determining whether a third party application has been initialized via a client computing device. The third party application can be an application that is installed at the computing device and/or otherwise accessible via the computing device, such as an application having functionality that is available via a remote server device. When the third party application is determined to have not been initialized, the method 300 can bypass proceeding until the third party application is initialized or is otherwise being accessed by a user. However, when the third party application is determined to have been initialized, the method 300 can proceed to an operation 304.

The operation 304 can include determining whether a particular operation has been initialized via the third party application. The operation can correspond to any feature of the third party application such as, for example, a feature that is accessible via an interface of the third party application. For instance, when the third party application is a messaging application, the operation can include rendering a message received from another user at a graphical user interface of the computing device. Additionally, or alternatively, the third party application can be a social media application, a navigation application, a shopping application, an IoT controls application, a security application, and/or any other type of application that can be accessible via a computing device. When an operation is determined to have not been initialized, the method 300 can return to the operation 302. However, when an operation has been initialized via the third party application, the method 300 can proceed to an operation 306.

The operation 306 can include causing a dependent object of a client container to be assigned a reference value based on the initialized operation. The dependent object of the client container can be assigned the reference value according to the operation initialized via the third party application. The operation can be initialized in response to a user input, an inter-process communication, an operation system signal, and/or any other transmission of data that can be associated with a computing device. As an example, a user can provide an input to a graphical user interface of the third party application in order to initialize performance of an operation by the third party application. The input can correspond to a selection of a particular function, which can provide a basis for the reference value. For example, the user input can cause another interface of the third party application to be rendered at the computing device, and the other interface can provide access to functions characterized by the injector container.

The method 300 can proceed from the operation 306 to an operation 308, which can include causing a corresponding injector container to be instantiated in memory of the computing device. The injector container can include one or more objects that can be correlated to one or more other objects identified in the client container. As an example, the injector container can include a function that assigns a reference value to a dependent object identified in the client container according to a user input from the user. For instance, the injector container can characterize a function that indicates whether to provide a suggestion to a user regarding particular content being rendered at an interface of the third party application. In some implementations, in response to a user input, the function can assign a reference value to the dependent object of the client container in order to employ an automated assistant function to render the suggestion. The method 300 can proceed from the operation 308 to an operation 310 for determining whether the injector container provides a correspondence between an automated assistant function and the reference value.

In order to make the determination at the operation 310, the third party application and/or the computing device can determine whether the reference value identifies an automated assistant function. This determination can be based on information provided in the injector container. For example, the injector container can provide information that characterizes a correspondence between the reference value and a function. When the injector container identifies a correspondence between the reference value and an automated assistant function, the method 300 can proceed to an operation 312. However, when the injector container identifies a correspondence between the reference value and a non-automated assistant function, the method 300 can proceed to an operation 316.

The operation 312 can include causing an assistant service container, which includes the automated assistant function, to be instantiated in memory. By instantiating the automated assistant service container into memory, the automated assistant function corresponding to the reference value can be executed via one or more processors of the computing device. For example, the method 300 can include an optional operation 314 for generating data that provides a correspondence between the automated assistant function and the dependent object. The generated data can characterize addresses for the automated assistant function data and the dependent object, and/or otherwise characterize the automated assistant function as being part of the client container. The method 300 can proceed from the operation 312 and/or the operation 314 to the operation 316.

The operation 316 can include causing the third party application operation to be executed. For instance, when the third party application operation includes the automated assistant function, the third party application can cause the automated assistant function to be executed. In some implementations, the automated assistant function can receive one or more input parameters from the third party application while the automated assistant function is correlated to the client container. As an example, the third party application can provide one or more input parameters for the automated assistant function based on content being rendered at an interface of the third party application. In this way, when the automated assistant function corresponds to an operation for generating suggestions, the third party application can provide assistant suggestions based on current content being rendered. By providing suggestions in this way, the third party application can maintain control of third party application content, without having to share the content via some other extensive inter-process communications. Moreover, this can preserve memory resources of the computing device as the third party application would not necessarily instantiate all available containers when initialized, but rather, can rely on injected dependencies for instantiating containers into memory as needed.

Figure 4:
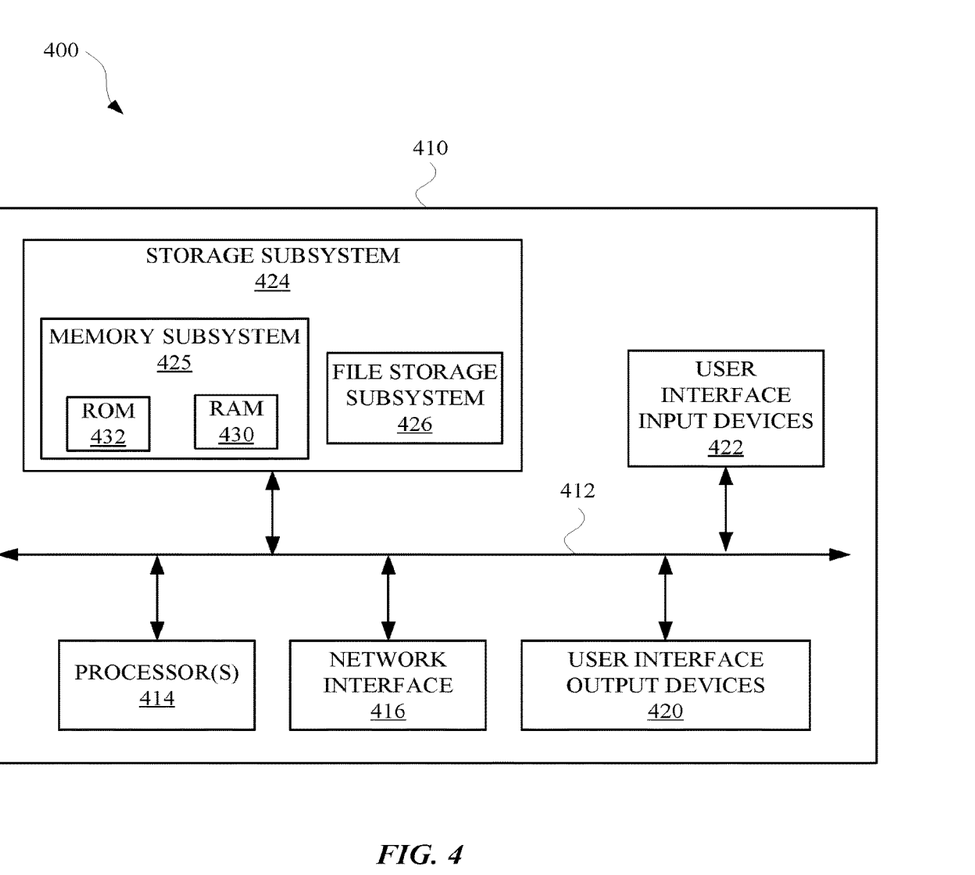
FIG. 4 is a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 102, automated assistant 106, other computing device 238, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as causing, at a computing device, an instance of a container to be in memory of the computing device when a user is accessing a client application via the computing device, wherein the container includes a dependent object that is associated with an automated assistant function that is not instantiated in the memory. The method can further include an operation of determining, when the user is accessing the client application, that the user has provided an input to an interface of the client application, wherein the input is provided by the user in furtherance of causing a performance of an automated assistant action via the client application. The method can further include an operation of causing, based on determining that the user has provided the input to the interface of the client application, the dependent object to be assigned a value in accordance with the input from the user. The method can further include an operation of causing another container to be instantiated in the memory of the computing device, wherein the other container includes the automated assistant function and fulfills a dependency between the dependent object and the automated assistant function. The method can further include an operation of initializing, when the automated assistant function is instantiated in the memory, performance of the automated assistant action by causing execution of the dependent object of the container, wherein the performance of the automated assistant action results in client application content being generated based on the value assigned to the dependent object. The method can further include an operation of causing, based on initializing performance of the automated assistant action, the client application to render the client application content at the interface.

In some implementations, the method can further include an operation of determining, based on the input to the interface of the client application, whether the input corresponds to restricted content; and in response to determining that the input corresponds to restricted content, generating the client application content at the computing device using the automated assistant function. In some implementations, the method can further include an operation of determining, based on the input to the interface of the client application, whether the input corresponds to restricted content; and in response to determining that the input does not correspond to restricted content, initializing the automated assistant action at a remote server device that is in communication with the computing device, and receiving the client application content from the remote server device.

In some implementations, the container further includes an object variable that is correlated to a parameter of the dependent object. In some implementations, the method can further include an operation of assigning a particular value to the object variable, wherein the particular value is based on natural language content being rendered at the interface of the client application or based on the input from the user. In some implementations, the method can further include an operation of subsequent to determining that the user has provided the input to the interface of the client application: determining that the user has provided a separate input to another client application, wherein a particular container of the other client application is instantiated in the memory of the computing device, and wherein the particular container includes a separate dependent object that is assigned to the automated assistant function that is also instantiated in the memory. In some implementations, the method can further include an operation of causing, based on the separate input from the user, the separate dependent object to be assigned a different value in accordance with the input from the user. In some implementations, the client application allows the user to initialize different actions relative to other actions that the user can initialize via the other client application. In some implementations, the client application includes messaging functionality that allows the user to send natural language content to other users via the client application.

In other implementations, a method implemented by one or more processors is set forth as including operations such as causing, while a client application is executing at a computing device, an injector container and a client container to be instantiated in memory of the computing device, wherein the client container includes a dependent object that is associated with one or more automated assistant functions that are not instantiated in the memory. The method can further include an operation of determining, while the client application is executing at the computing device, that a user has provided an input to the client application in furtherance of causing the client application to perform an operation. The method can further include an operation of generating, based on the input from the user, parameter data that provides a correlation between the dependent object identified in the client container and a particular automated assistant function of the one or more automated assistant functions identified by the injector container. The method can further include an operation of causing, based on the particular automated assistant function identified by the injector container, a service container to be instantiated into the memory of the computing device, wherein the service container includes the particular automated assistant function that is referenced by the parameter data. The method can further include an operation of generating, by the client application, client application content using the particular automated assistant function, wherein the client application content is rendered via an interface of the computing device.

In some implementations, the user input is provided to a graphical user interface of the client application and the injector container is instantiated in the memory of the computing device when the graphical user interface is rendered at the interface of the computing device. In some implementations, generating the client application content includes: when or after the client application content is rendered, causing the service container to no longer be instantiated in the memory of the computing device.

In yet other implementations, a method implemented by one or more processors is set forth as including operations such as causing, by a client application, an instance of a client container and an instance of an injector container to be in memory of a computing device that provides access to an automated assistant, wherein the client container includes a dependent object, and wherein the injector container identifies multiple different automated assistant functions that can be assigned to the dependent object according to an operation of the client application. The method can further include an operation of initializing, by the client application and while the client container and the injector container are instantiated in the memory, performance of an application operation that is associated with the automated assistant. The method can further include an operation of causing, based on the client application initializing the application operation, the dependent object of the client container to be assigned a particular automated assistant function identified in the injector container. The method can further include an operation of causing, by the client application and based on the application operation, a particular service container to be instantiated in the memory of the computing device, wherein the particular service container includes the particular automated assistant function and fulfills a dependency between the dependent object and the particular automated assistant function. The method can further include an operation of causing, when the particular automated assistant function is instantiated in the memory, execution of the dependent object and the particular automated assistant function, wherein the execution of the dependent object and the particular automated assistant function results in client application content being generated. The method can further include an operation of rendering, via the computing device or another computing device, the client application content.

In some implementations, the method can further include an operation of determining whether the application operation is associated with restricted content; and in response to determining that the application operation is associated with the restricted content, generating the client application content at the computing device using the particular automated assistant function. In some implementations, the method can further include an operation of determining whether the application operation is associated with restricted content; and in response to determining that the application operation is not associated with the restricted content: initializing execution of the particular automated assistant function or a different automated assistant function at a remote server device that is in communication with the computing device, and receiving the client application content from the remote server device.

In some implementations, the client container further includes an object variable that is correlated to a parameter of the dependent object. In some implementations, the method can further include an operation of assigning a particular value to the object variable, wherein the particular value is based on natural language content or an image being rendered at an interface of the client application, or based on an input from a user. In some implementations, the method can further include an operation of determining that another client application is executing a different application operation, wherein a particular container of the other client application is instantiated in the memory of the computing device, and wherein the particular container includes a separate dependent object that is assigned to the particular automated assistant function that is also instantiated in the memory. In some implementations, the method can further include an operation of causing the separate dependent object to be assigned a different value based on one or more different inputs to the other client application. In some implementations, the client application allows a user initialize actions that are different from other actions that the user can initialize via the other client application.

I claim:

1. A method implemented by one or more processors, the method comprising:
   causing, at a computing device and in response to a user accessing a first application via the computing device, an instance of a container to be in memory of the computing device,
   wherein the container includes one or more dependent objects;
   receiving, while the user is accessing the first application, an input from a user, the input being received at an interface of the first application and being in furtherance of causing performance of a function of a second application;
   causing, at the computing device and in response to receiving the input from the user at the interface of the first application, an additional container to be instantiated in the memory of the computing device,
   wherein the additional container includes the function of the second application, and wherein the additional container fulfills a dependency between the function of the second application and a dependent object, out of the one or more dependent objects, of the container; and
   initializing, in response to the additional container being instantiated in the memory, the performance of the function of the second application by causing execution of the dependent object of the container.

2. The method of claim 1, wherein the first application is a client application installed at the computing device, and the second application is an automated assistant.

3. The method of claim 1, wherein causing, at the computing device and in response to receiving the input from the user at the interface of the first application, the additional container to be instantiated in the memory of the computing device comprises:
   identifying, in response to the input from the user, the dependent object out of the one or more dependent objects based on the dependent object being associated with the second application,
   assigning, based on the input from the user, a value to the identified dependent object that corresponds to the function of the second application, and
   causing, based on the dependent object being assigned the value that corresponds to the function of the second application, the additional container to be instantiated in the memory.

4. The method of claim 1, further comprising:
   determining, based on the input to the interface of the first application, whether the input corresponds to restricted content; and
   in response to determining that the input corresponds to restricted content, processing the input from the user locally at the computing device.

5. The method of claim 4, wherein processing the input from the user locally at the computing device comprises: processing the input from the user locally at the computing device using the function of the second application.

6. The method of claim 1, further comprising:
   determining, based on the input to the interface of the first application, whether the input corresponds to restricted content; and
   in response to determining that the input does not correspond to restricted content, initializing the performance of the function of the second application at a remote server device that is in communication with the computing device.

7. The method of claim 1, wherein the container further includes an object variable that is correlated to a parameter of the dependent object.

8. The method of claim 7, further comprising:
   assigning a particular value to the object variable, wherein the particular value is based on natural language content being rendered at the interface of the client application or based on the input from the user.

9. The method of claim 1, further comprising:
subsequent to determining that the user has provided the input to the interface of the first application:
  determining that the user has provided a separate input to a third application different from the first and second application,
    wherein a particular container of the third application is instantiated in the memory of the computing device, and
    wherein the particular container includes a separate dependent object that is assigned to the function of the second application that is also instantiated in the memory.

10. The method of claim 9, further comprising:
causing, based on the separate input from the user, the separate dependent object to be assigned a different value in accordance with the input from the user.

11. The method of claim 9, wherein the first application allows the user to initialize different actions relative to other actions that the user can initialize via the third application.

12. The method of claim 1, wherein the first application includes a messaging functionality that allows the user to send natural language content to other users via the first application, and/or a camera functionality.

13. The method of claim 1, wherein the interface of the first application is an interface of a conversation, wherein the function of the second application is performed to generate a selectable suggestion for the conversation, and wherein the method further comprises:
causing the selectable suggestion to be rendered at the interface of the conversation.

14. A computing device comprising:
memory;
one or more processors operable to execute instructions to:
  cause, in response to a user accessing a first application via the computing device, an instance of a container to be in the memory of the computing device,
    wherein the container includes one or more dependent objects;
  receive, while the user is accessing the first application, an input from a user, the input being received at an interface of the first application and being in furtherance of causing performance of a function of a second application;
  cause, in response to receiving the input from the user at the interface of the first application, an additional container to be instantiated in the memory of the computing device,
    wherein the additional container includes the function of the second application, and wherein the additional container fulfills a dependency between the function of the second application and a dependent object, out of the one or more dependent objects, of the container; and
  initialize, in response to the additional container being instantiated in the memory, the performance of the function of the second application by causing execution of the dependent object of the container.

15. The computing device of claim 14, wherein the first application is a client application installed at the computing device, and the second application is an automated assistant.

16. The computing device of claim 14, wherein in causing, in response to receiving the input from the user at the interface of the first application, the additional container to be instantiated in the memory of the computing device, one or more of the processors are to:
  identify, in response to the input from the user, the dependent object out of the one or more dependent objects based on the dependent object being associated with the second application,
  assign, based on the input from the user, a value to the identified dependent object that corresponds to the function of the second application, and
  cause, based on the dependent object being assigned the value that corresponds to the function of the second application, the additional container to be instantiated in the memory.

17. The computing device of claim 14, wherein one or more of the processors are further operable to execute the instructions to:
  determine, based on the input to the interface of the first application, whether the input corresponds to restricted content; and
  in response to determining that the input corresponds to restricted content, process the input from the user locally at the computing device.

18. The computing device of claim 17, wherein in processing the input from the user locally at the computing device, one or more of the processors are to: process the input from the user locally at the computing device using the function of the second application.

19. The computing device of claim 14, wherein one or more of the processors are further operable to execute the instructions to:
  determine, based on the input to the interface of the first application, whether the input corresponds to restricted content; and
  in response to determining that the input does not correspond to restricted content, initialize the performance of the function of the second application at a remote server device that is in communication with the computing device.

20. The computing device of claim 14, wherein the container further includes an object variable that is correlated to a parameter of the dependent object.

* * * * *